(12) United States Patent
Connor

(10) Patent No.: US 9,635,849 B2
(45) Date of Patent: May 2, 2017

(54) RETRACTABLE DEER STAND LADDER SYSTEM

(71) Applicant: Sean H. Connor, Baton Rouge, LA (US)

(72) Inventor: Sean H. Connor, Baton Rouge, LA (US)

( * ) Notice: Subject to any disclaimer, the term of this patent is extended or adjusted under 35 U.S.C. 154(b) by 0 days.

(21) Appl. No.: 14/671,428

(22) Filed: Mar. 27, 2015

(65) Prior Publication Data

US 2016/0281425 A1    Sep. 29, 2016

(51) Int. Cl.
| | | |
|---|---|---|
| E06C 5/04 | (2006.01) |
| A01M 31/02 | (2006.01) |
| E06C 1/10 | (2006.01) |
| E06C 1/38 | (2006.01) |
| E06C 9/02 | (2006.01) |

(52) U.S. Cl.
CPC .............. *A01M 31/02* (2013.01); *E06C 1/10* (2013.01); *E06C 1/381* (2013.01); *E06C 9/02* (2013.01)

(58) Field of Classification Search
CPC ..... E06C 1/02; E06C 1/06; E06C 1/12; E06C 1/39; E06C 1/387; E06C 7/08; E06C 7/082
See application file for complete search history.

(56) References Cited

U.S. PATENT DOCUMENTS

| | | | | |
|---|---|---|---|---|
| 295,127 A * | 3/1884 | miller | ...................... | E06C 9/085 182/160 |
| 646,291 A * | 3/1900 | kruger | ...................... | E06C 1/381 182/156 |
| 1,313,444 A * | 8/1919 | witherow | ................ | E06C 1/387 182/156 |
| 1,831,332 A * | 11/1931 | wagner | ...................... | E06C 9/14 182/156 |
| 2,148,099 A * | 2/1939 | Bray | ........................ | B66B 5/027 182/156 |
| 3,019,851 A * | 2/1962 | Doss | ........................ | E06C 1/381 182/111 |
| 4,132,288 A * | 1/1979 | Bingham | ................ | E06C 1/387 182/100 |
| 4,139,079 A * | 2/1979 | Clark | ...................... | B63B 27/14 182/100 |

(Continued)

FOREIGN PATENT DOCUMENTS

| | | | | |
|---|---|---|---|---|
| DE | 29914289 U1 | * 12/1999 | ............... | E06C 1/38 |
| EP | 142851 | * 5/1985 | | |

*Primary Examiner* — Alvin Chin-Shue
*Assistant Examiner* — Candace L Bradford
(74) *Attorney, Agent, or Firm* — Neustel Law Offices

(57) ABSTRACT

A retractable deer stand ladder system for providing a ladder that is efficiently concealed from wildlife. The retractable deer stand ladder system generally includes a support member having an elongated structure, an upper end and a lower end, a plurality of first steps pivotally attached to a first side of the support member, and a plurality of second steps pivotally attached to a second side of the support member. The first steps and the second steps each have an extended state where the steps extend outwardly from the support member for a user to climb upon. The first steps and the second steps also have a refracted state where the steps extend substantially parallel with respect to the support member for concealment.

7 Claims, 20 Drawing Sheets

(56) References Cited

U.S. PATENT DOCUMENTS

| | | | | |
|---|---|---|---|---|
| 4,258,828 A * | 3/1981 | Evans | ................ | B63B 15/0083 |
| | | | | 182/100 |
| 5,040,635 A * | 8/1991 | Strickland | ................ | E06C 1/381 |
| | | | | 182/100 |
| 5,388,664 A * | 2/1995 | Bator | .................... | A01M 31/02 |
| | | | | 182/100 |
| 5,967,270 A | 10/1999 | Shyr | | |
| 6,145,621 A * | 11/2000 | Nye | ......................... | E06C 7/08 |
| | | | | 182/159 |
| 6,340,071 B1 * | 1/2002 | Diekemper | ............... | E06C 1/34 |
| | | | | 182/100 |
| 6,547,035 B1 * | 4/2003 | D'Acquisto | .......... | A01M 31/00 |
| | | | | 182/100 |
| 6,578,905 B1 * | 6/2003 | Buchanan | .......... | B62D 33/0612 |
| | | | | 182/96 |
| 6,782,840 B1 * | 8/2004 | Garelick | ................ | B63B 27/14 |
| | | | | 114/362 |
| 8,556,035 B1 * | 10/2013 | Kendall | ................ | E06C 1/381 |
| | | | | 182/156 |
| 2006/0169535 A1 * | 8/2006 | Phillips | .................... | E06C 1/39 |
| | | | | 182/119 |
| 2012/0125715 A1 * | 5/2012 | Furseth | .................. | E06C 1/381 |
| | | | | 182/194 |

* cited by examiner

RETRACTABLE DEER STAND LADDER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a deer stand ladder and more specifically it relates to a retractable deer stand ladder system for providing a ladder that is efficiently concealed from wildlife.

Description of the Related Art

Any discussion of the related art throughout the specification should in no way be considered as an admission that such related art is widely known or forms part of common general knowledge in the field.

A conventional ladder stand is comprised of a ladder and a platform with a seat for a hunter. The ladder stand is typically attached to a tree using a rope, chain, ratchet straps or cam buckle straps. The ladder for a ladder stand is comprised of a pair of ladder rails that are parallel to one another with a plurality of ladder rungs extending between the ladder rails for a user to climb upon. The platform for the ladder stand includes a floor and side rails to prevent the user from falling off the stand. The platform further typically includes a seat for the user to sit upon.

Unfortunately, conventional ladder stands for hunting animals such as deer are large and bulky. One problem with convention ladder stands is they are easily identified by humans and animals. While conventional ladder stands attempt to conceal the ladder portion, the ladder stands commercially available utilize a static ladder that does not change shape to blend in with the environment.

Because of the inherent problems with the related art, there is a need for a new and improved retractable deer stand ladder system for providing a ladder that is efficiently concealed from wildlife.

BRIEF SUMMARY OF THE INVENTION

The invention generally relates to a deer stand ladder which includes a support member having an elongated structure, an upper end and a lower end, a plurality of first steps pivotally attached to a first side of the support member, and a plurality of second steps pivotally attached to a second side of the support member. The first steps and the second steps each have an extended state where the steps extend outwardly from the support member for a user to climb upon. The first steps and the second steps also have a retracted state where the steps extend substantially parallel with respect to the support member for concealment.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
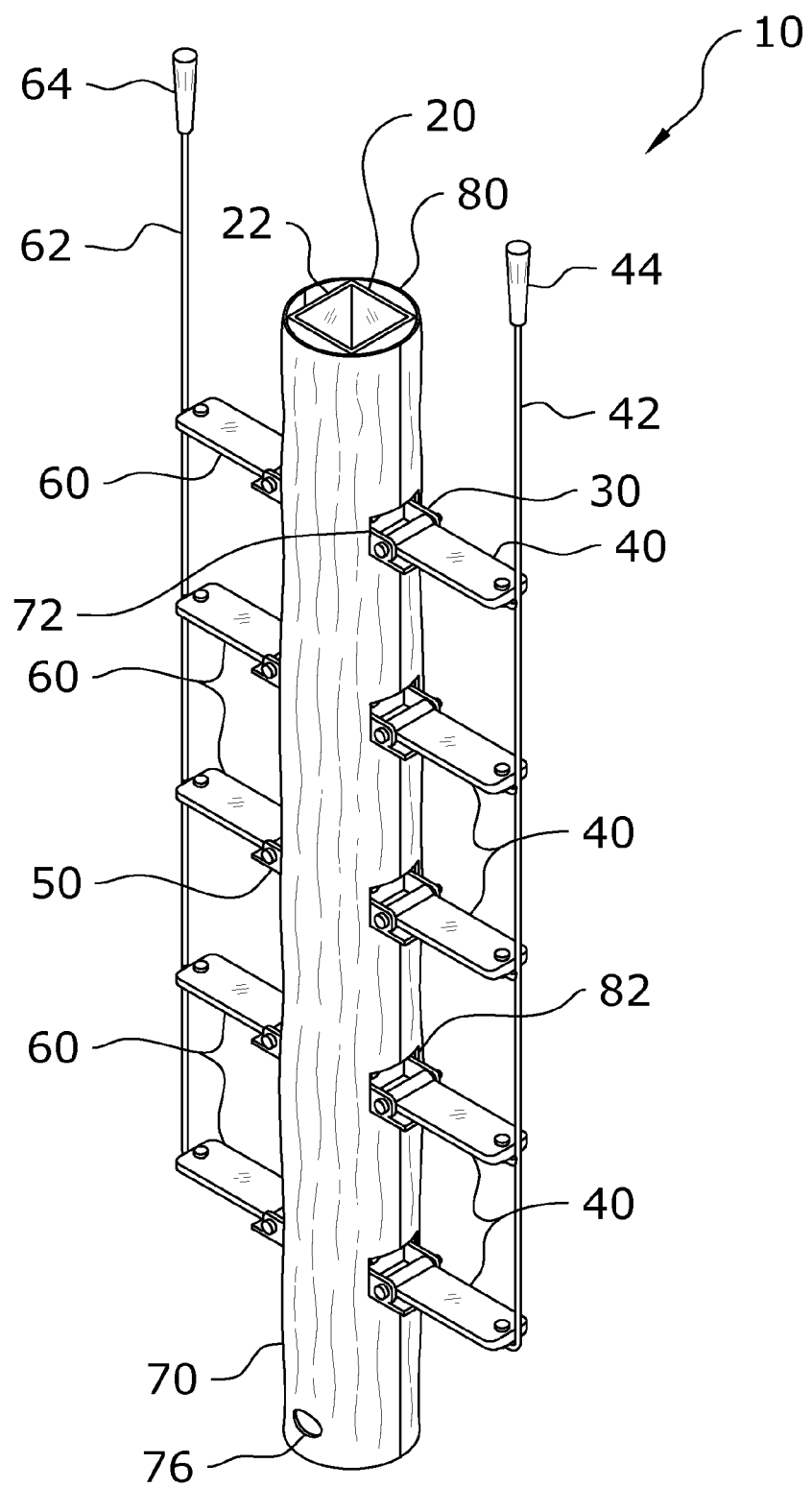
FIG. 1 is an upper perspective view of the present invention with the steps in the extended state.
Figure 2:
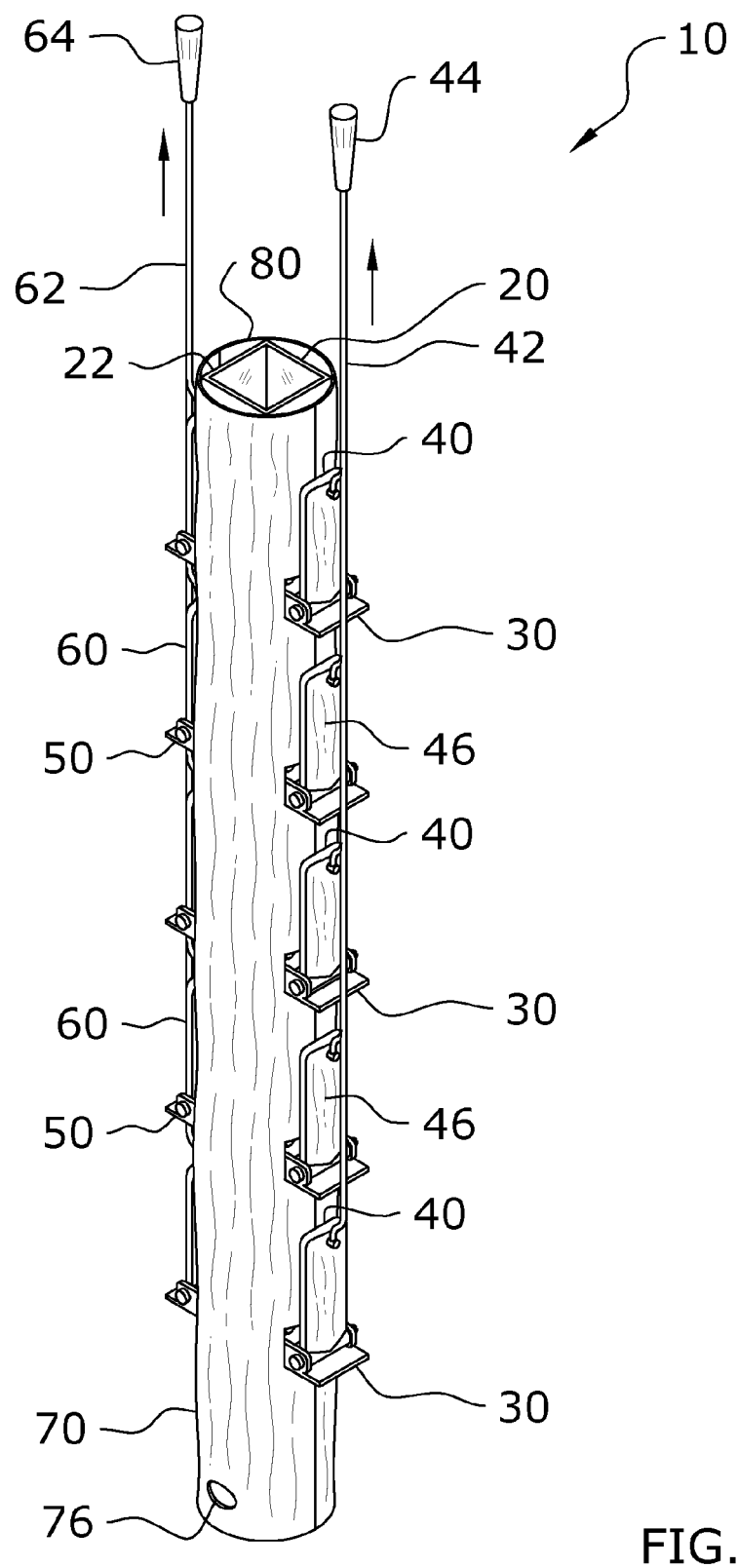
FIG. 2 is an upper perspective view of the present invention with the steps in the retracted state.

Turning now descriptively to the drawings, in which similar reference characters denote similar elements throughout the several views, FIGS. 1 through 22 illustrate a retractable ladder 10, which comprises a support member 20 having an elongated structure, an upper end 22 and a lower end 24, a plurality of first steps 40 pivotally attached to a first side of the support member 20, and a plurality of second steps 60 pivotally attached to a second side of the support member 20. The first steps 40 and the second steps 60 each have an extended state where the steps extend outwardly from the support member 20 for a user to climb upon. The first steps 40 and the second steps 60 also have a retracted state where the steps extend substantially parallel with respect to the support member 20 for concealment.

The retractable ladder 10 may be utilized with various types of stands such as, but not limited to, deer hunting stands, lock on stands, hang on stands, tree 14 mounted stands and the like. The retractable ladder 10 is preferably utilized in combination with a platform 12 to form a ladder stand for hunting. The platform 12 may have various structures commonly used in ladder stands such as a floor, handles, a seat, railing and the like. The retractable ladder 10 may be utilized with various other types of structures where providing access to an elevated location and concealment are important.

The combination of the support member 20, the plurality of first steps 40 and the plurality of second steps 60 form a vertical compact structure when in the retracted state as illustrated in FIGS. 2, 7, 9, 12 and 13 of the drawings. The combination of the support member 20, the plurality of first steps 40 and the plurality of second steps 60 do not form a vertical compact structure when in the extended state because of the steps 40, 60 extending outwardly from the support member 20 as illustrated in FIGS. 1, 6, 8, 10 and 11 of the drawings.

B. Support Member

Figure 3:
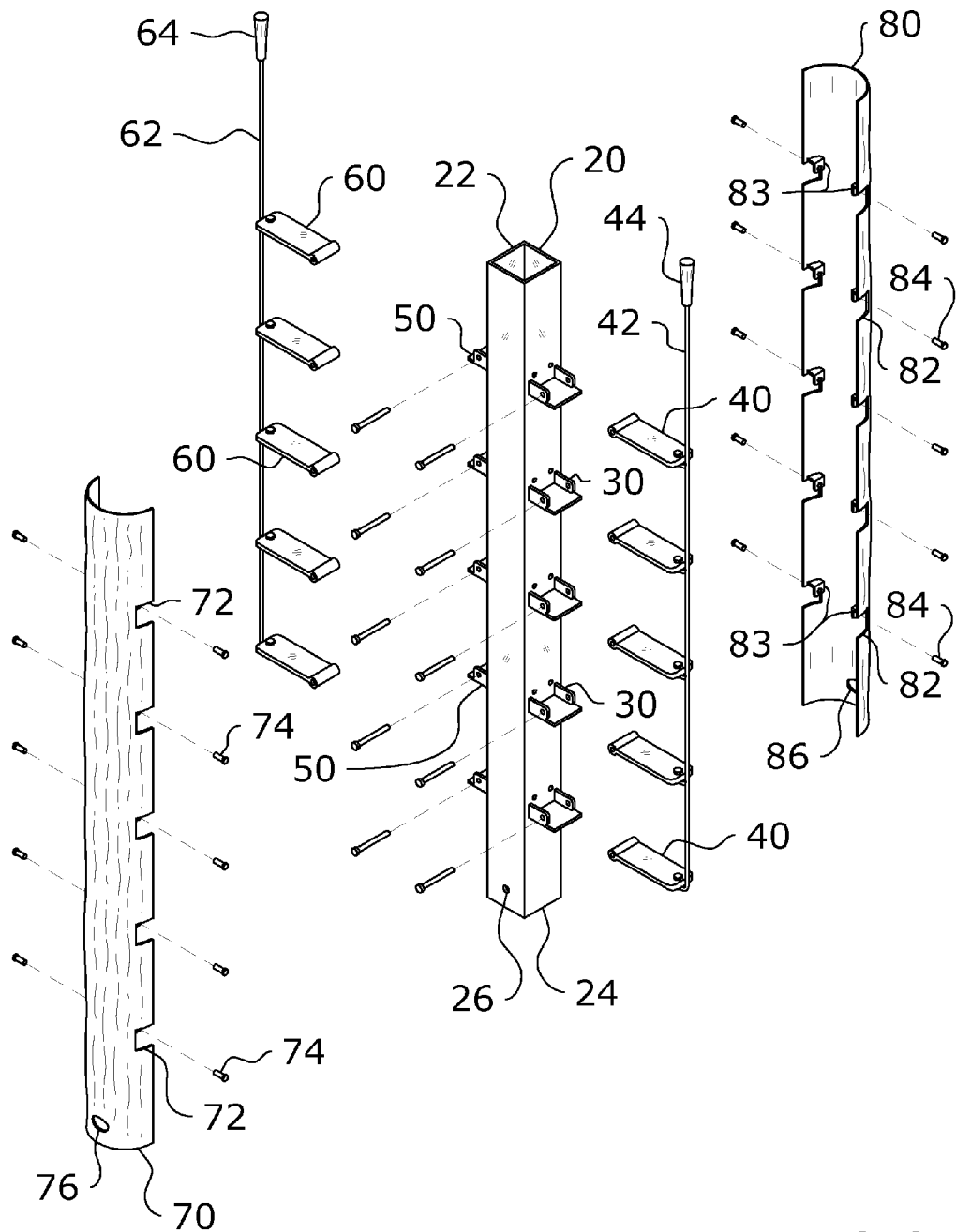
FIG. 3 is an exploded upper perspective view of the present invention.
Figure 4:
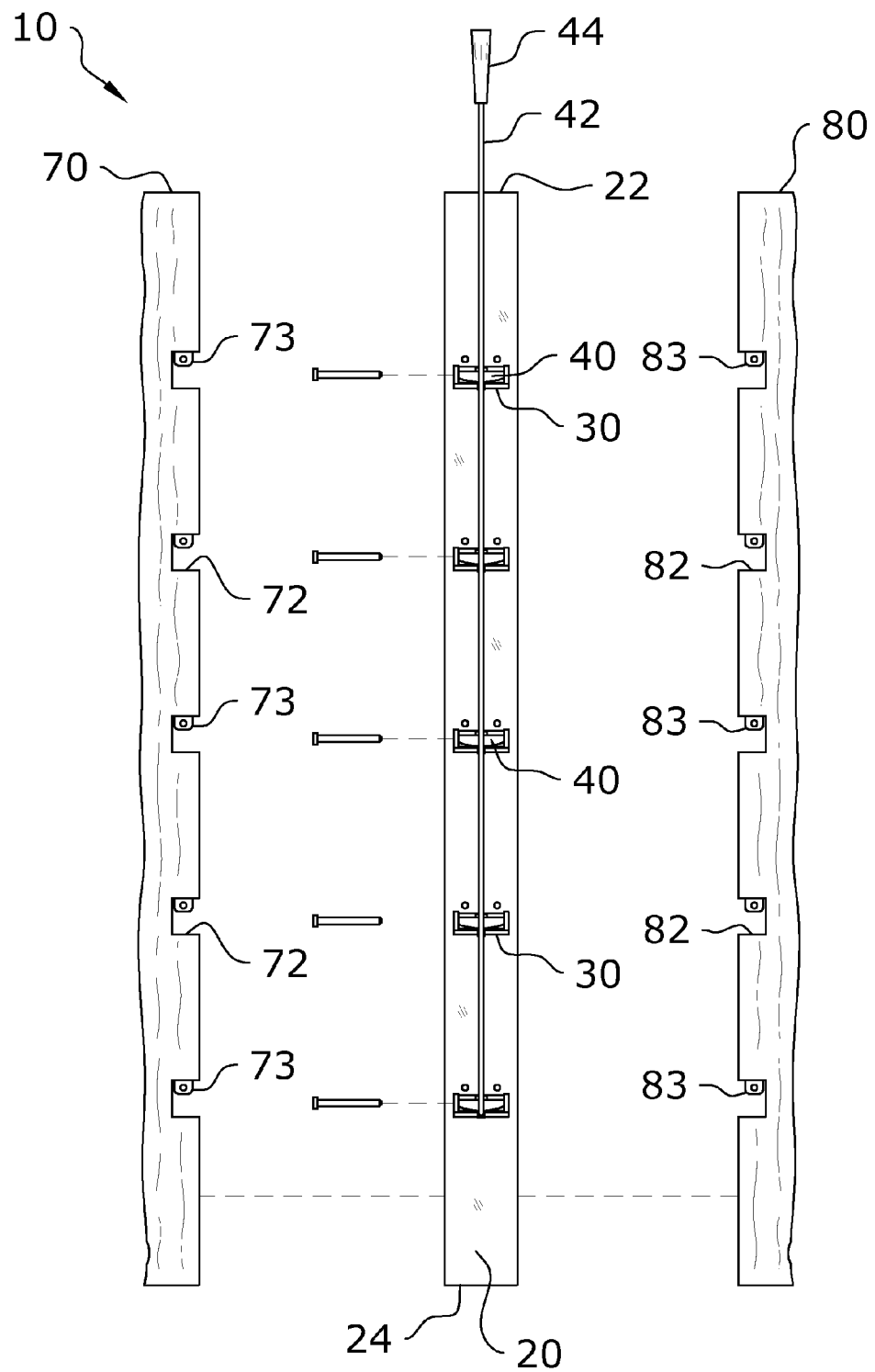
FIG. 4 is an exploded right side view of the present invention.
Figure 5:
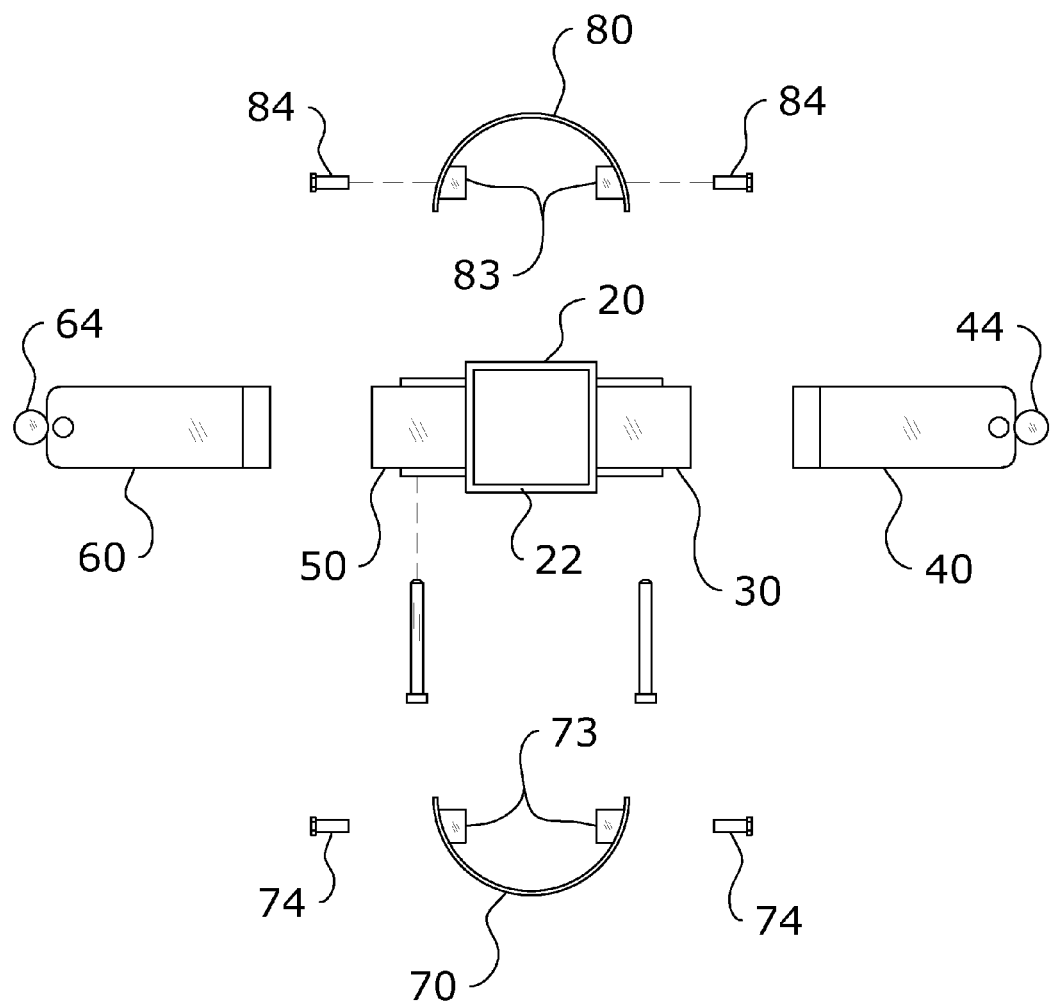
FIG. 5 is an exploded top view of the present invention.

The support member 20 is comprised of an elongated structure that extends in a substantially vertical manner. The support member 20 has an upper end 22 and a lower end 24 as illustrated in FIGS. 3 and 4 of the drawings. The support member 20 may have various lengths such as, but not limited to, 6 feet, 10 feet and the like. The support member 20 may also have various widths and depths such as, but not limited to, 4 inches or 6 inches.

A plurality of support members 20 may be stacked end to end to form an elongated vertical structure with the respective ends of the support members 20 attached to one another. For example, the upper end 22 of a first support member 20 may be attached to the lower end 24 of a second support member 20, wherein the support members 20 are aligned with one another. The support members 20 may be attached to one another with conventional fasteners.

The support member 20 preferably has a rectangular cross sectional shape with four sides, wherein the first side supporting the first steps 40 is parallel with respect to the second side supporting the second steps 60. The support member 20 may be comprised of various other cross sectional shapes such as but not limited to circular, triangular and the like. The support member 20 is preferably comprised of a tubular structure but may also be comprised of a solid structure. The support member 20 is constructed of a rigid material such as, but not limited to, metal or wood.

Figure 14:
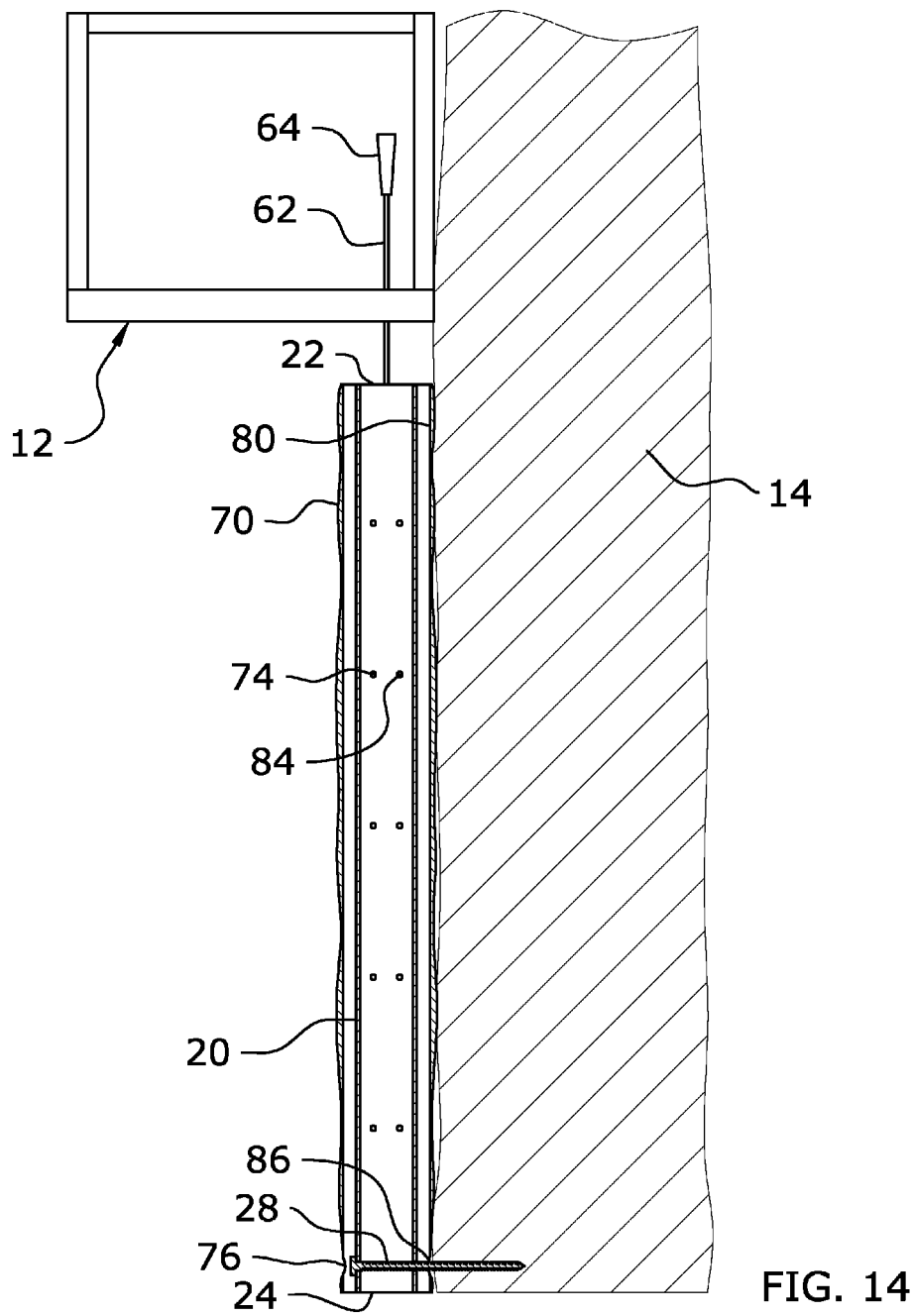
FIG. 14 is a right side cutaway view of the retractable ladder attached to a tree providing access to a platform.

The support member 20 preferably includes a lower opening 26 in a lower portion that receives a mounting fastener 28 that extends through the support member 20 into a tree 14 for securing the support member 20 to the tree 14 as illustrated in FIGS. 3 and 14 of the drawings. Additional openings within the support member 20 may be used to receive additional fasteners for attaching to a tree 14. In addition, additional support beams may be attached to the support member 20 that support the support member 20 at various heights that are secured to the tree 14 with a ratchet strap or other securing device. The additional support beams may have the visual appearance of a branch.

C. Steps

Figure 6:
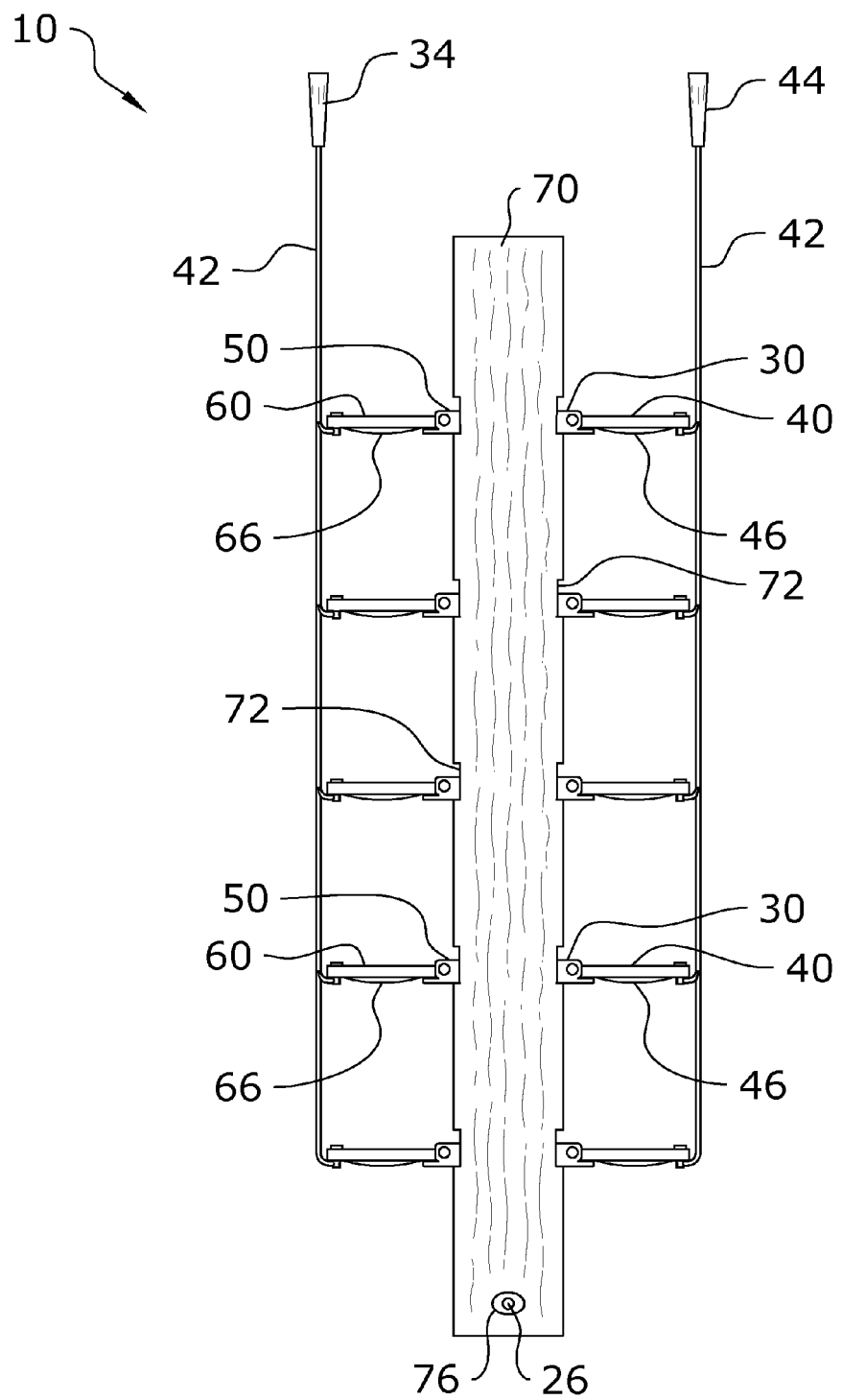
FIG. 6 is a front view of the present invention in the extended state.
Figure 7:
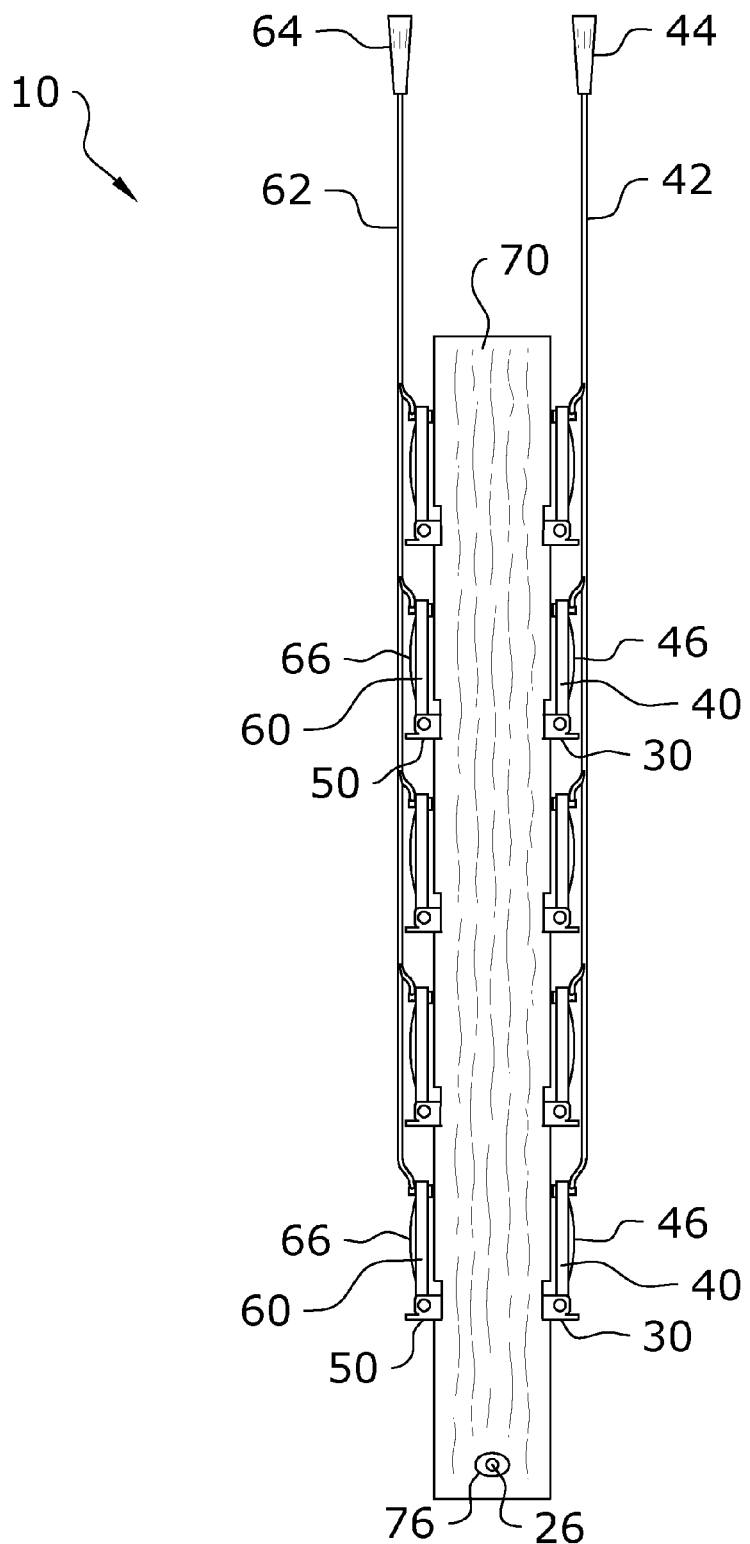
FIG. 7 is a front view of the present invention in the retracted state for concealing the retractable ladder.
Figure 8:
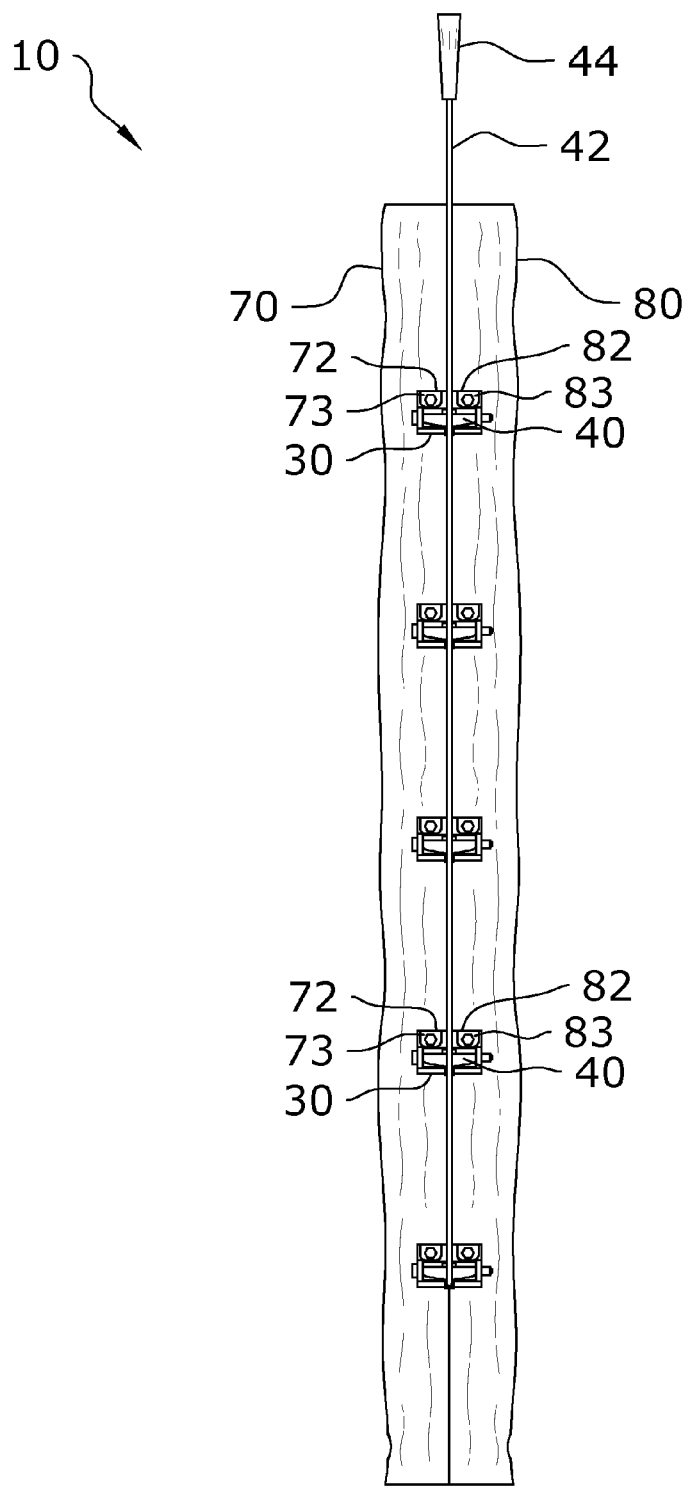
FIG. 8 is a right side view of the retractable ladder with the steps in the extended state.
Figure 9:
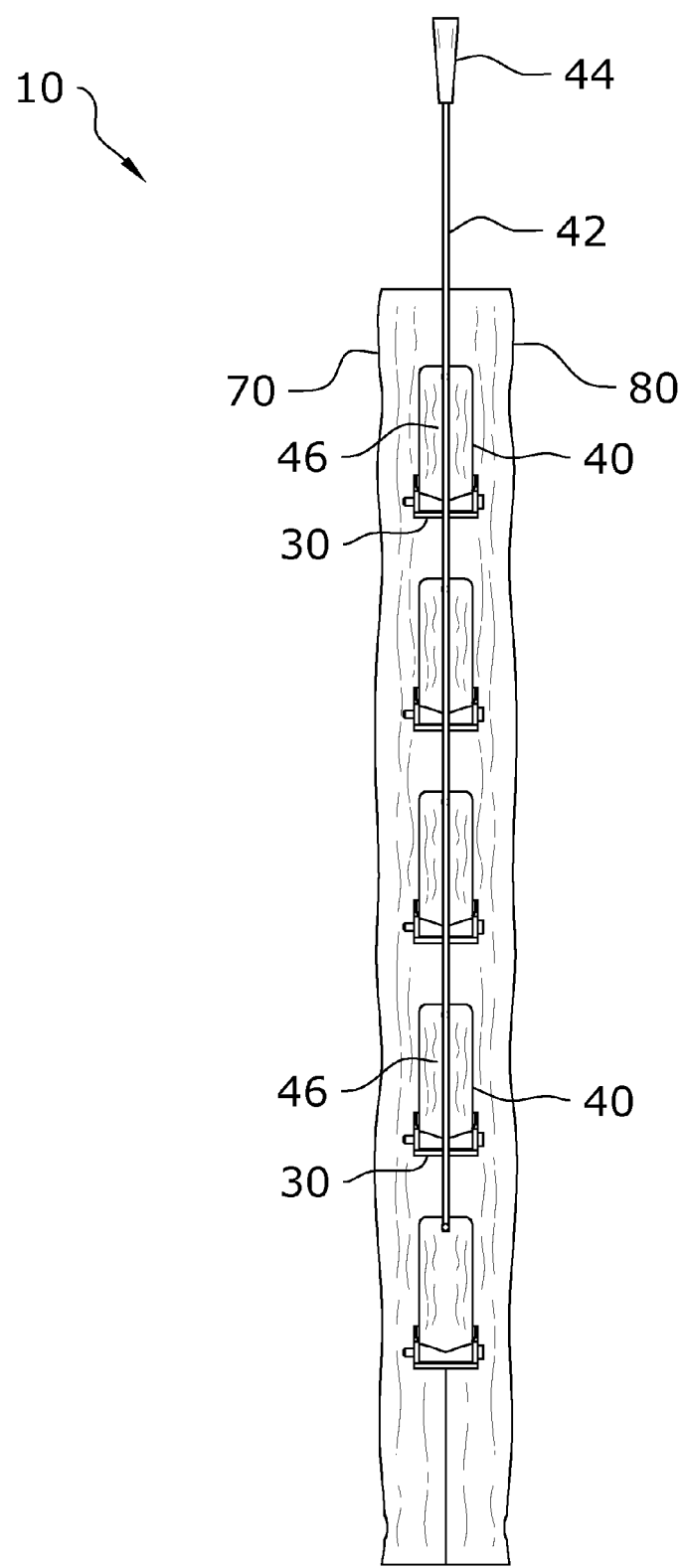
FIG. 9 is a right side view of the retractable ladder with the steps in the retracted state.
Figure 10:
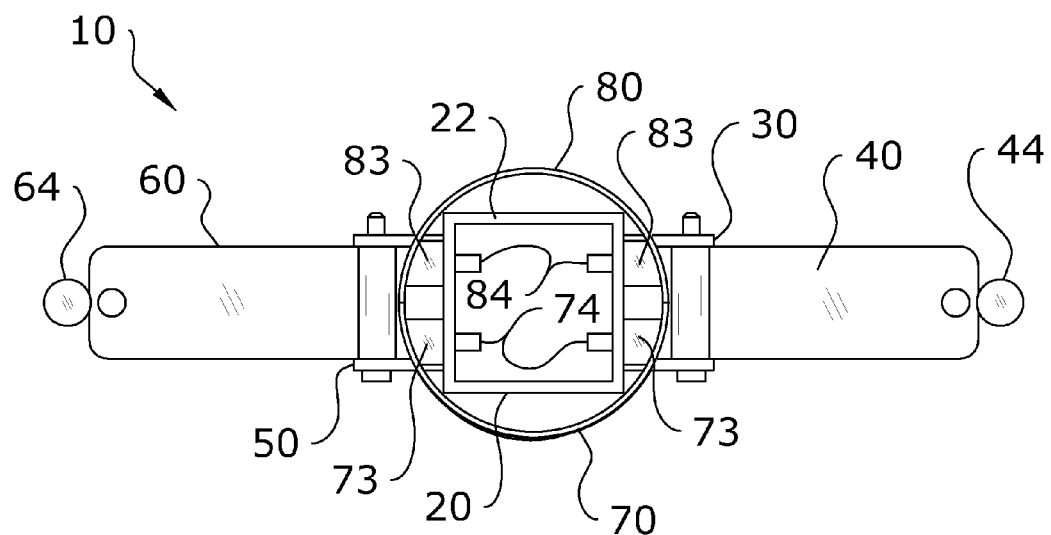
FIG. 10 is a top view of the retractable ladder with the steps in the extended state.
Figure 11:
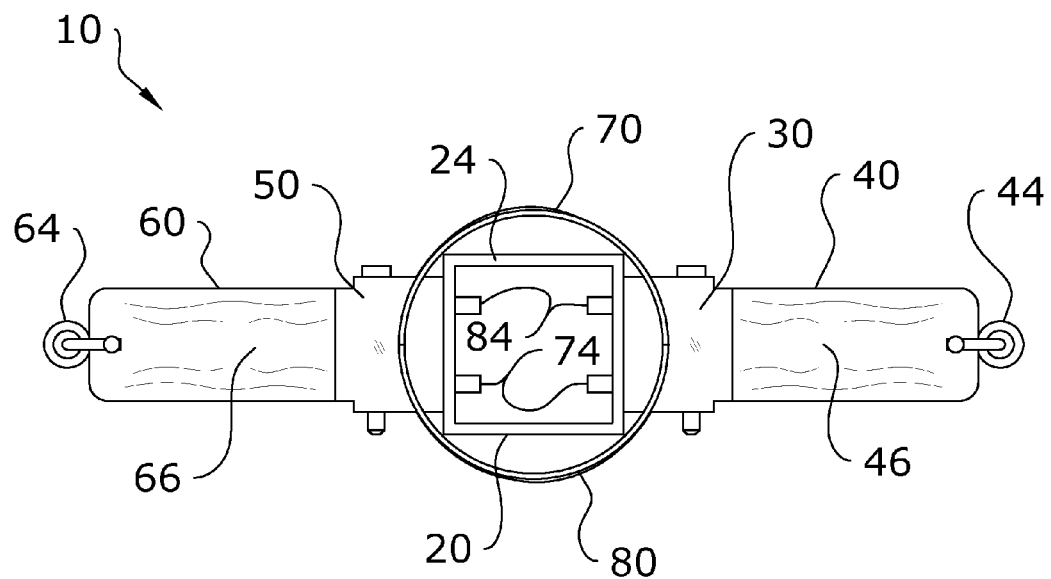
FIG. 11 is a bottom view of the retractable ladder with the steps in the extended state.
Figure 12:
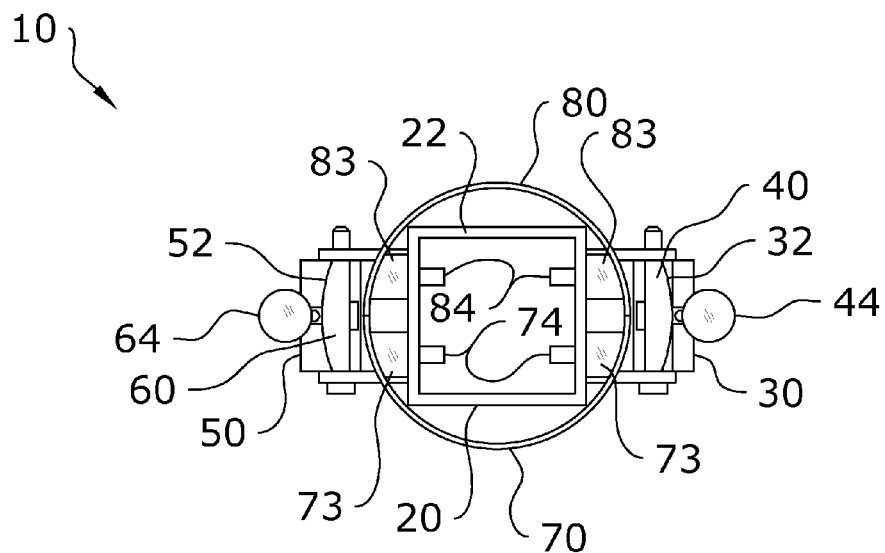
FIG. 12 is a top view of the retractable ladder with the steps in the retracted state.
Figure 13:
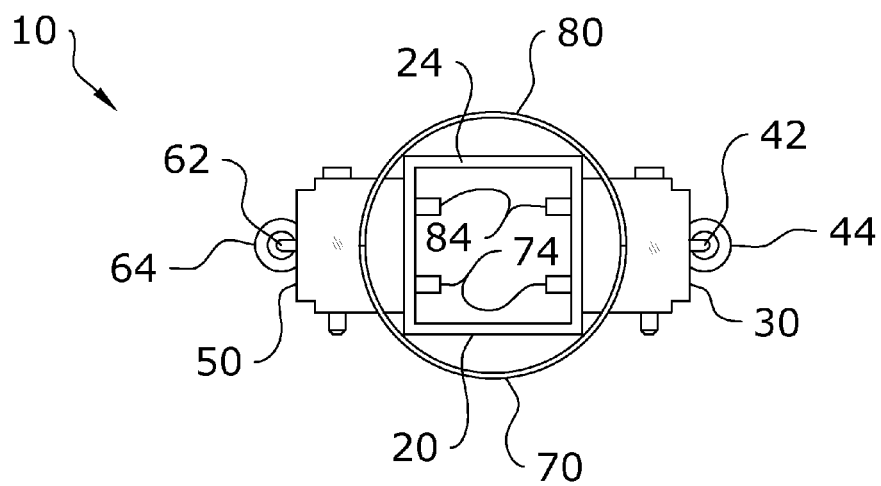
FIG. 13 is a bottom view of the retractable ladder with the steps in the retracted state.

A plurality of first steps 40 are pivotally attached to the first side of the support member 20 and a plurality of second steps 60 are pivotally attached to a second side of the support member 20. The first side of the support member 20 is preferably opposite of the second side when the support member 20 has a rectangular cross sectional shape. However, the first side may be the same side as the second side (e.g. when the support member 20 has a circular cross sectional shape). The support member 20 is centrally positioned between the plurality of first steps 40 and the plurality of second steps 60 as illustrated in FIGS. 6 and 7 of the drawings. The steps 40, 60 are constructed of a rigid material such as, but not limited to, metal.

The first steps 40 and the second steps 60 include an extended state for allowing a user to climb upon the steps 40, 60 as illustrated in FIGS. 1, 6, 8, 10 and 11 of the drawings. The first steps 40 extend away from the second steps 60 and the second steps 60 extend away from the first steps 40 when the steps 40, 60 are in the extended state. It is preferable that each first step 40 corresponds to and is aligned with a second step 60 along a common horizontal plane as illustrated in FIG. 6 of the drawings.

The first steps 40 and the second steps 60 also include a retracted state to at least partially conceal the steps 40, 60 as illustrated in FIGS. 2, 7, 9, 12 and 13 of the drawings. In the retracted state, the steps 40, 60 are substantially concealed from view by being positioned substantially parallel with respect to the support member 20. The steps 40, 60 further extend upwardly when in the retracted state.

A plurality of first brackets 30 are attached to the first side of the support member 20. Each of the plurality of first steps 40 are pivotally attached to a corresponding first bracket 30 of the plurality of first brackets 30. The first brackets 30 each have a horizontal portion that extends outwardly and a pair of vertical portions extending upwardly from the side portion of the horizontal portion. An aperture extends through the vertical portions of the first bracket 30 to receive a pivot pin that extends through the aperture and through a corresponding aperture within an inner end of the first step 40 creating a pivot point for the first step 40. The horizontal portion extends outwardly from the pivot point thereby creating a stopper end portion that prevents the first step 40 from pivoting downwardly and further supporting the first step 40 in a substantially horizontal position when in the extended state as best illustrated in FIG. 6 of the drawings. The first step 40 is free to pivot upwardly into the retracted state as illustrated in FIG. 7 of the drawings.

Similar to the first steps 40 and first brackets 30, a plurality of second brackets 50 are attached to the second side of the support member 20. Each of the plurality of second steps 60 are pivotally attached to a corresponding second bracket 50 of the plurality of second brackets 50. The second brackets 50 each have a horizontal portion that extends outwardly and a pair of vertical portions extending upwardly from the side portion of the horizontal portion. An aperture extends through the vertical portions of the second bracket 50 to receive a pivot pin that extends through the aperture and through a corresponding aperture within an inner end of the second step 60 creating a pivot point for the second step 60. The horizontal portion extends outwardly from the pivot point thereby creating a stopper end portion that prevents the second step 60 from pivoting downwardly and further supporting the second step 60 in a substantially horizontal position when in the extended state as best illustrated in FIG. 6 of the drawings. The second step 60 is free to pivot upwardly into the retracted state as illustrated in FIG. 7 of the drawings.

The first steps 40 preferably each include a first camouflage portion 46 attached to a lower surface of the plurality of first steps 40. The first camouflage portion 46 may be attached to the first step 40 using an adhesive or other fastener. The first camouflage portion 46 has a camouflage visual appearance to assist in concealing the first steps 40 when in the retracted state as shown in FIG. 7. The first camouflage portion 46 may have the appearance of a portion of a tree 14 such as leaves, bark or other camouflage visual appearance.

Similar to the first steps 40, the second steps 60 preferably each include a second camouflage portion 66 attached to a lower surface of the plurality of second steps 60. The second camouflage portion 66 may be attached to the second step 60 using an adhesive or other fastener. The second camouflage portion 66 has a camouflage visual appearance to assist in concealing the second steps 60 when in the refracted state as shown in FIG. 7. The second camouflage portion 66 may have the appearance of a portion of a tree 14 such as leaves, bark or other camouflage visual appearance.

D. Connectors

A first connector 42 having an elongated structure and a second connector 62 having an elongated structure are utilized to allow a user on the platform 12 raise the steps 40, 60 into the retracted state for concealment of the steps 40, 60 or lower the steps into the extended state so the user can climb the steps 40, 60. The connectors 42, 62 may be comprised of various types of elongated materials such as, but not limited to, rope, string, cable, wire, chain, metal rod, plastic rod and the like. The connectors 42, 62 may be comprised of a rigid material or flexible material. The length of the connectors 42, 62 is sufficient to connect all of the steps 40, 60 and still extend upwardly from the uppermost of the steps 40, 60 as shown in FIG. 6. The steps 40, 60 are preferably equidistantly attached along the length of the connectors 42, 62 as illustrated in FIG. 6.

It is preferable that the upper end 22 of the first connector 42 includes a first handle 44 and the upper end 22 of the second connector 62 includes a second handle 64 for a user to grasp with their hands. While the embodiment illustrated utilizes manual force to lift and lower the steps 40, 60, a motor may also be connected to the connectors 42, 62 to lift and lower the steps 40, 60.

The first connector 42 is attached to distal portions of the plurality of first steps 40 and the second connector 62 is attached to distal portions of the plurality of second steps 60 as best illustrated in FIG. 6 of the drawings. The first connector 42 and the second connector 62 allow a user to pull upwardly upon the connectors thereby placing the steps in the refracted state. Once the steps 40, 60 are pulled upwardly into the retracted state as shown in FIG. 7, the user then can attach the connectors 42, 62 to a structure to prevent downward movement of the steps 40, 60.

E. Covers

A first cover 70 is preferably attached to the support member 20 to conceal the support member 20 and the brackets 30, 50. The first cover 70 covers a front portion of the support member 20. The first cover 70 includes a plurality of first slots 72 that receive the brackets 30, 50 and a plurality of first mounting brackets 73 that are secured to the support member 20 with a corresponding number of first fasteners 74. The first cover 70 is preferably an elongated structure approximately the same length as the support member 20 and has a rounded outer surface that has a camouflage pattern (e.g. the appearance of a trunk of a tree 14). The first cover 70 includes a first opening 76 that corresponds to the lower opening 26 to allow the user to secure the mounting fastener 28 into the tree 14.

A second cover 80 is preferably attached to the support member 20 opposite of the first cover 70 to conceal the support member 20 and the brackets 30, 50. The second cover 80 covers a rear portion of the support member 20 opposite of the first cover 70. Together, the first cover 70 and the second cover 80 substantially surround the support member 20 and form a tubular structure having a shape and appearance of the trunk of a tree 14. The second cover 80 includes a plurality of second slots 82 that receive the brackets 30, 50 and a plurality of second mounting brackets 83 that are secured to the support member 20 with a corresponding number of second fasteners 84. The second cover 80 is preferably an elongated structure approximately the same length as the support member 20 and has a rounded outer surface that has a camouflage pattern (e.g. the appearance of a trunk of a tree 14). The second cover 80 also preferably includes a second opening 86 that corresponds to the first opening 76 and the lower opening 26 to receive the mounting fastener 28.

F. Alternative Embodiments

Figure 15:
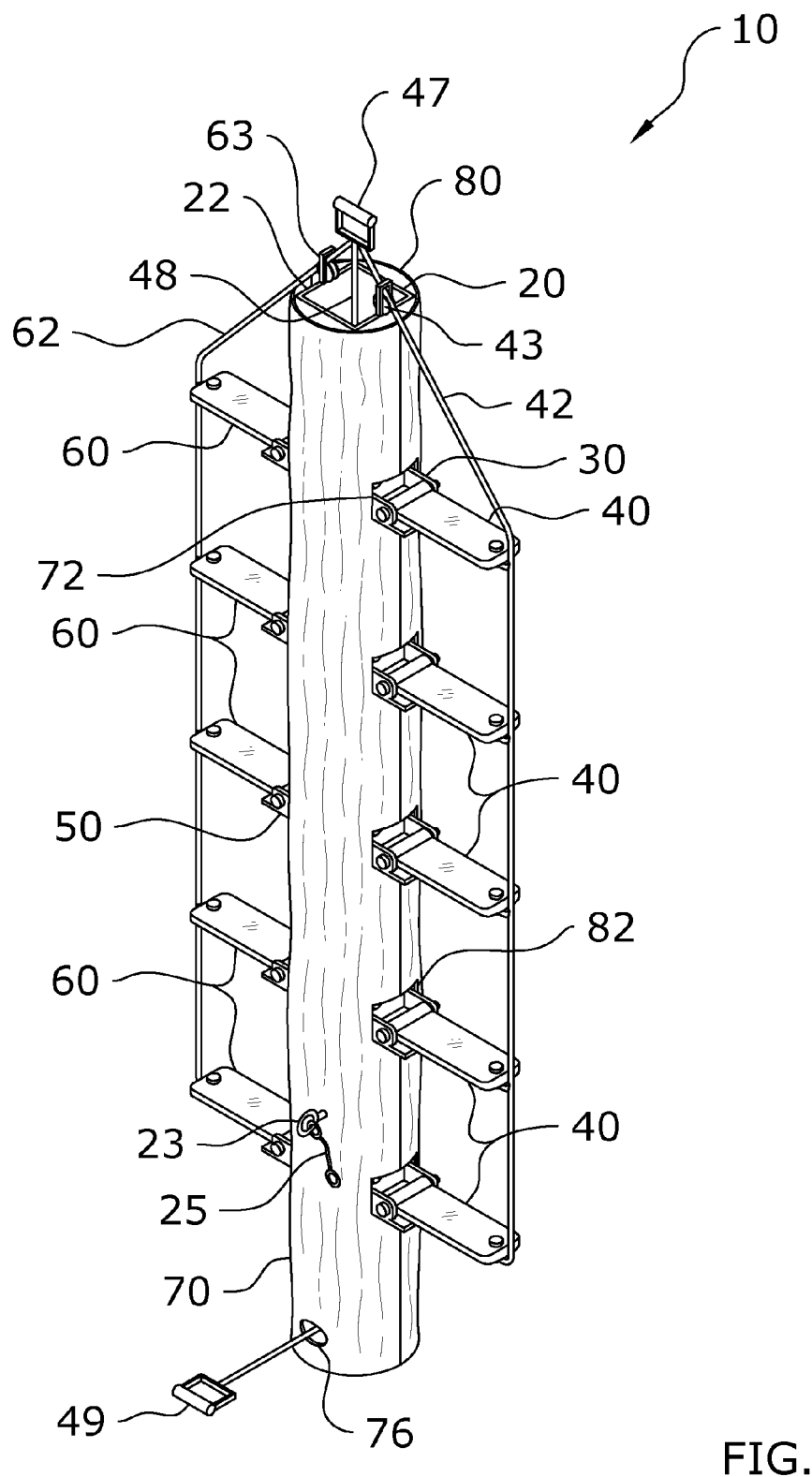
FIG. 15 is an upper perspective view of a first alternative embodiment for the present invention using an upper handle and a lower handle connected together via an auxiliary connector to manipulate the first and second connectors with the handles in a first state with the steps lowered.
Figure 18:
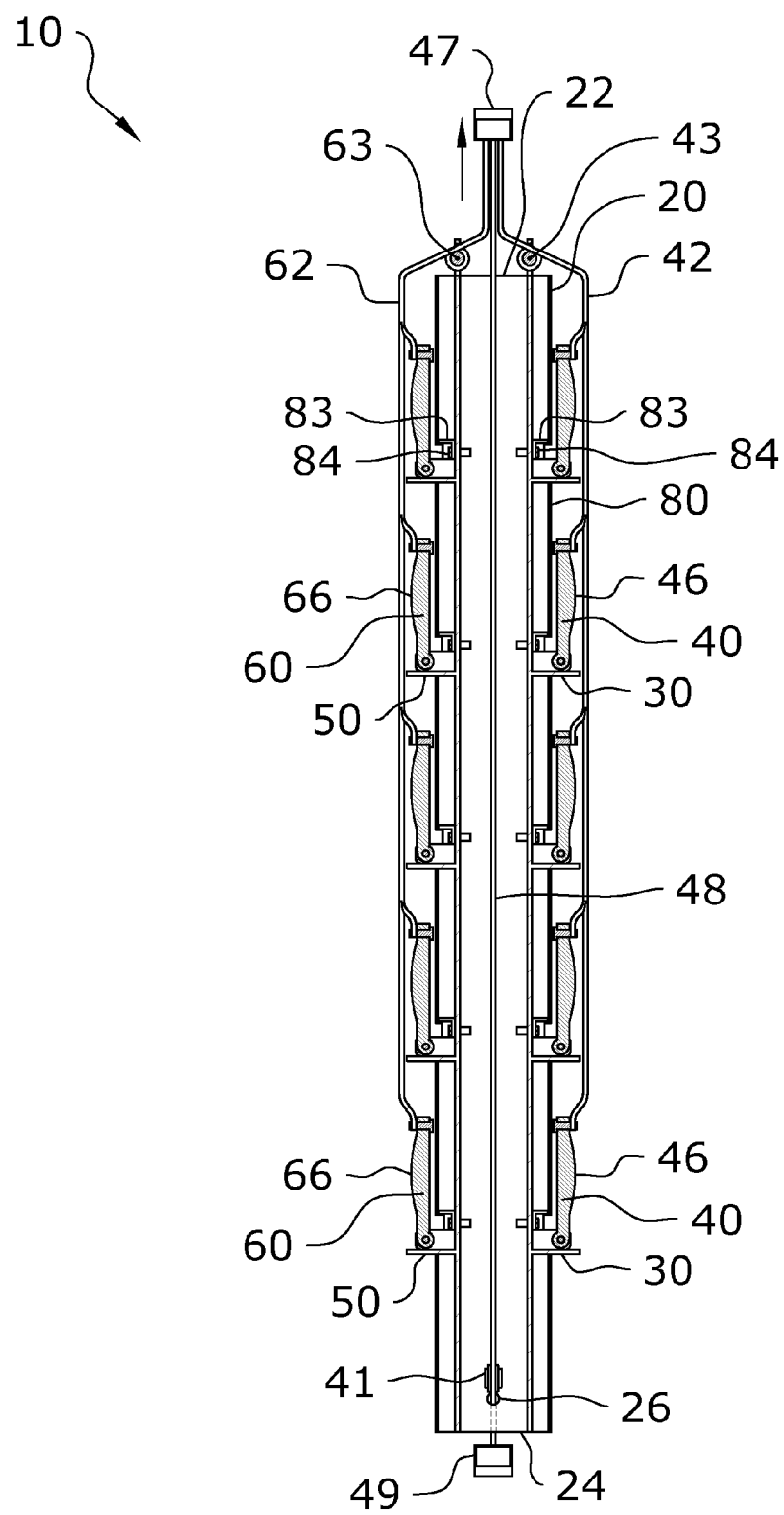
FIG. 18 is a cross sectional view of FIG. 16.
Figure 19:
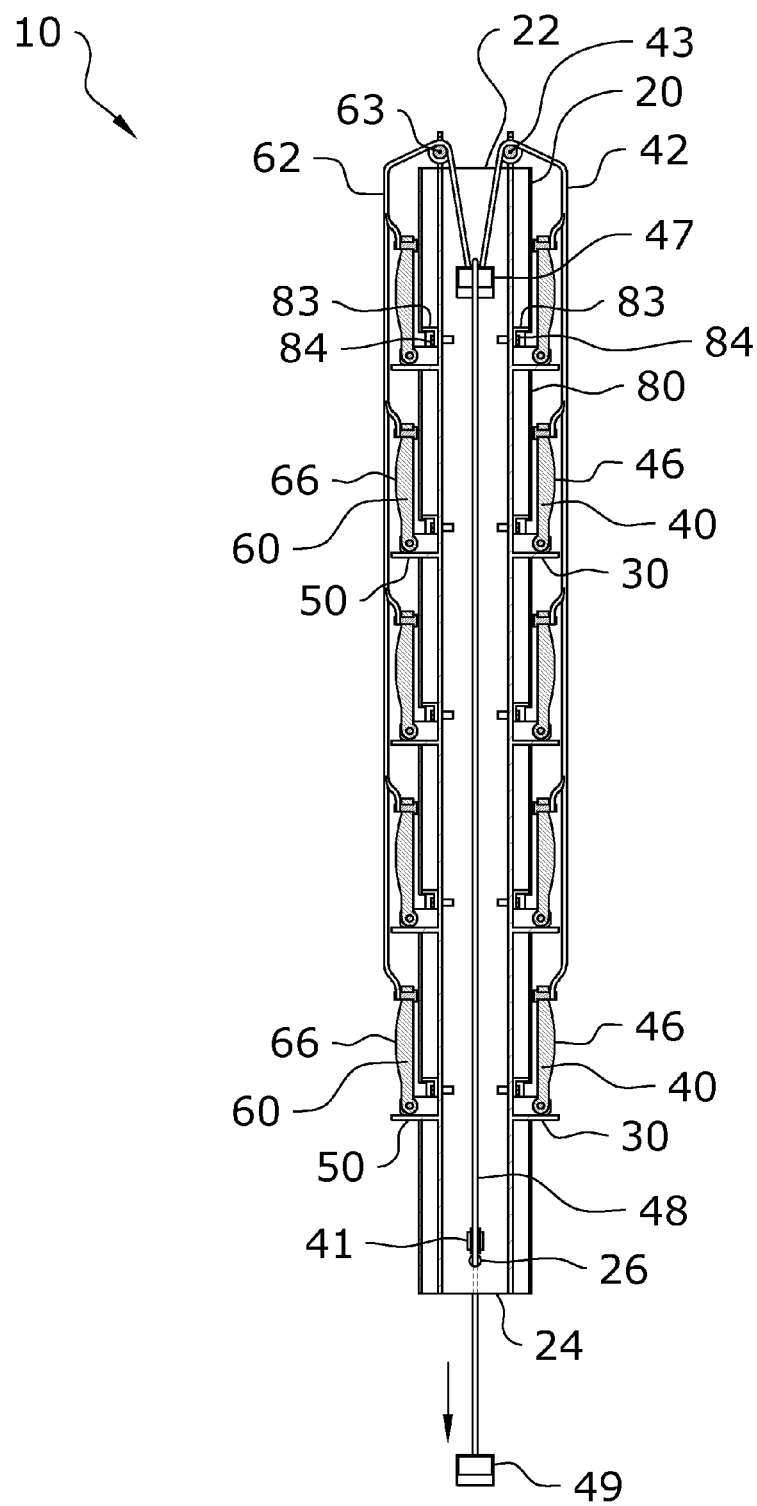
FIG. 19 is a cross sectional view of FIG. 17.

FIG. 15 is an upper perspective view of a first alternative embodiment for the retractable ladder 10 using an upper handle 47 and a lower handle 49 connected together via an auxiliary connector 48 (e.g. rope, cable) to manipulate the first and second connectors 42, 62 with the handles 47, 49 in a first state with the steps 40, 60 lowered. The auxiliary connector 48 may be comprised of various types of elongated flexible materials similar to the first and second connectors 42, 62. The upper handle 47 is connected to the first connector 42, the auxiliary connector 48 and the second connector 62 as illustrated in FIGS. 15, 16, 18 and 19 of the drawings. A lower pulley 41 is attached to a lower portion of the interior of the support member 20 to guide the auxiliary connector 48 centrally through the support member 20 and out through the lower opening 26 within the support member 20 and through the first opening 76 in the first cover 70 as illustrated in FIG. 18 of the drawings.

The auxiliary connector 48 has a length sufficient to extend through the entire support member 20. If more than one support member 20 is interconnected (as illustrated in FIG. 22), the length of the auxiliary connector 48 is sufficient to pass through all of the support members 20 when stacked together in a vertical manner (e.g. if there are three five foot sections of support members 20, the length of the auxiliary connector 48 will be at least 15 feet or longer).

Figure 22:
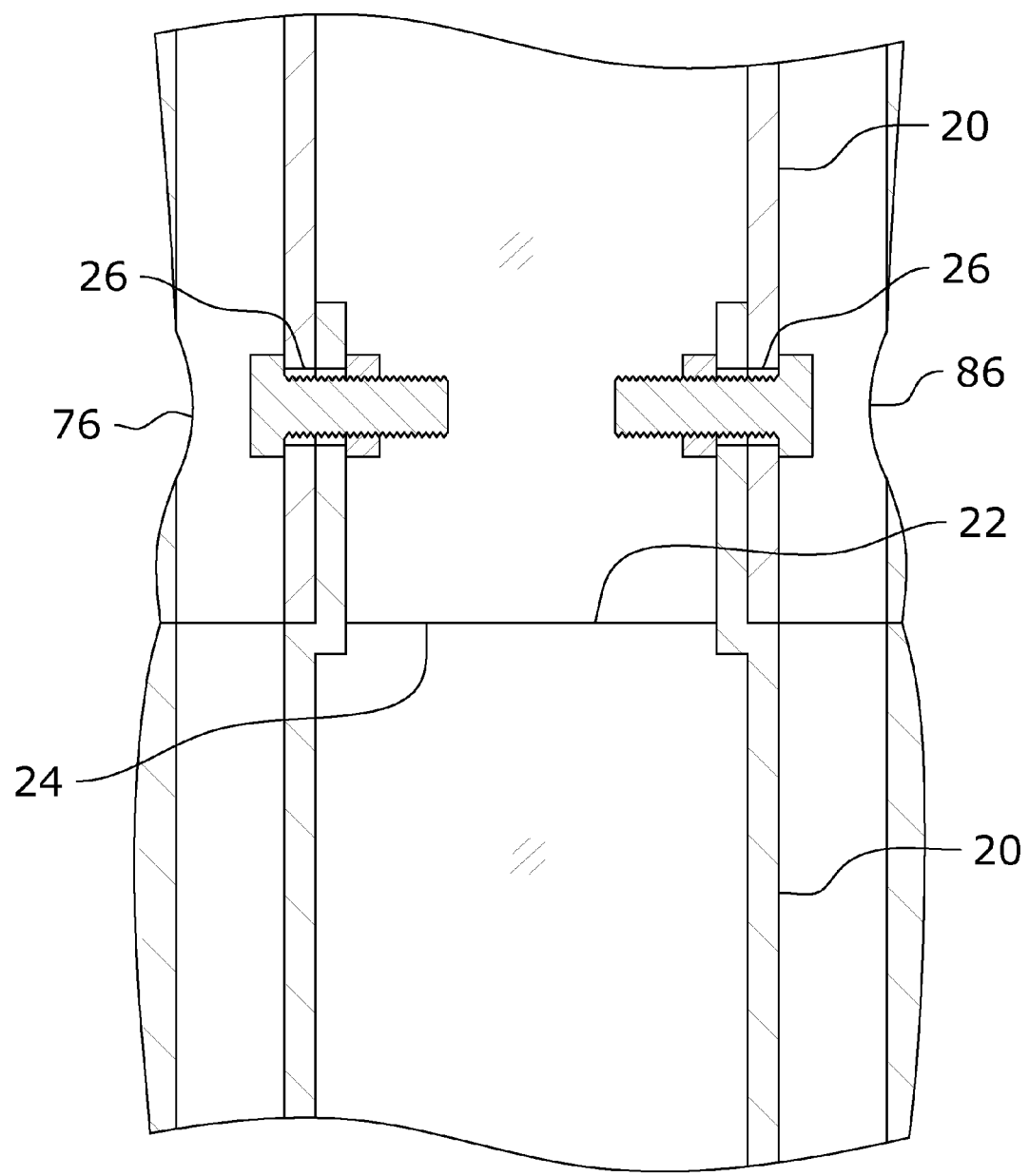
FIG. 22 is a magnified cross sectional view of the upper end of a first support member having a tapered structure that fits inside the lower opening within the lower end of a second support member allowing stacking of the support members.

FIG. 22 shows one embodiment of the support members 20 being interconnected in a vertically stacked end-to-end manner. FIG. 22 illustrates the upper end 22 of the lower support member 20 having a narrower size (e.g. tapered) compared to the lower opening of an upper support member 20 so that the upper end 22 of the lower support member 20 fits into the lower opening of the upper support member 20 as shown in FIG. 22. It is further preferable that one or more nuts are secured (e.g. welded) to the interior surface of the upper end 22 of the support member 20 that receive corresponding threaded fasteners extending through corresponding holes in the lower portion of the support member 20 to secure the two adjacent support members 20 together in a straight vertical manner as illustrated in FIG. 22. Any number of support members 20 may be stacked together to form a single vertical structure at a desired length such as 2, 3, 4, 5 or more support members 20. The support members 20 each may have various lengths such as 5, 10, 15 feet for each support member 20.

Figure 16:
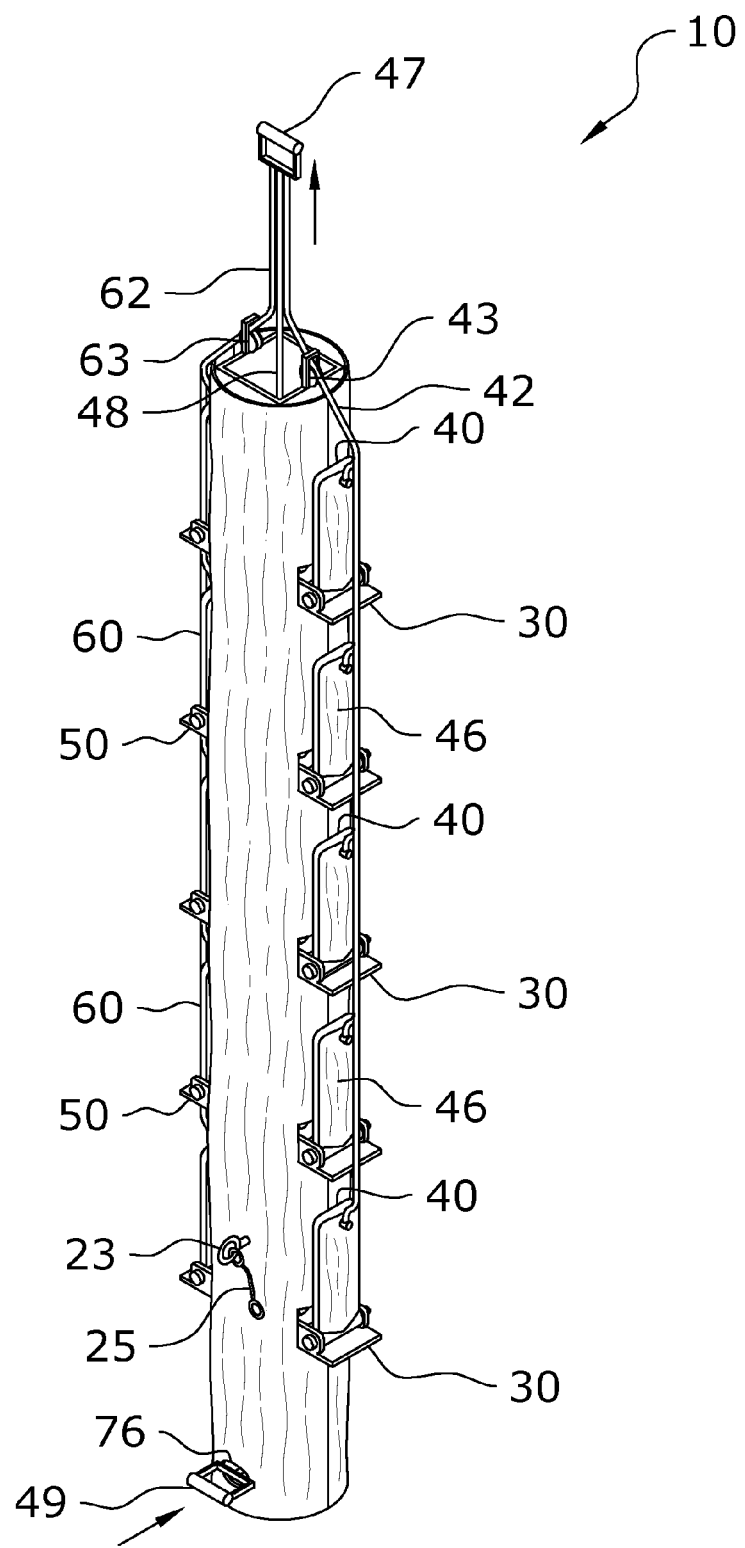
FIG. 16 is an upper perspective view of the first alternative embodiment with the handles in a second state with the lower handle pulled inwardly with the upper handle pulled upwardly and with the steps raised into the concealed position.
Figure 17:
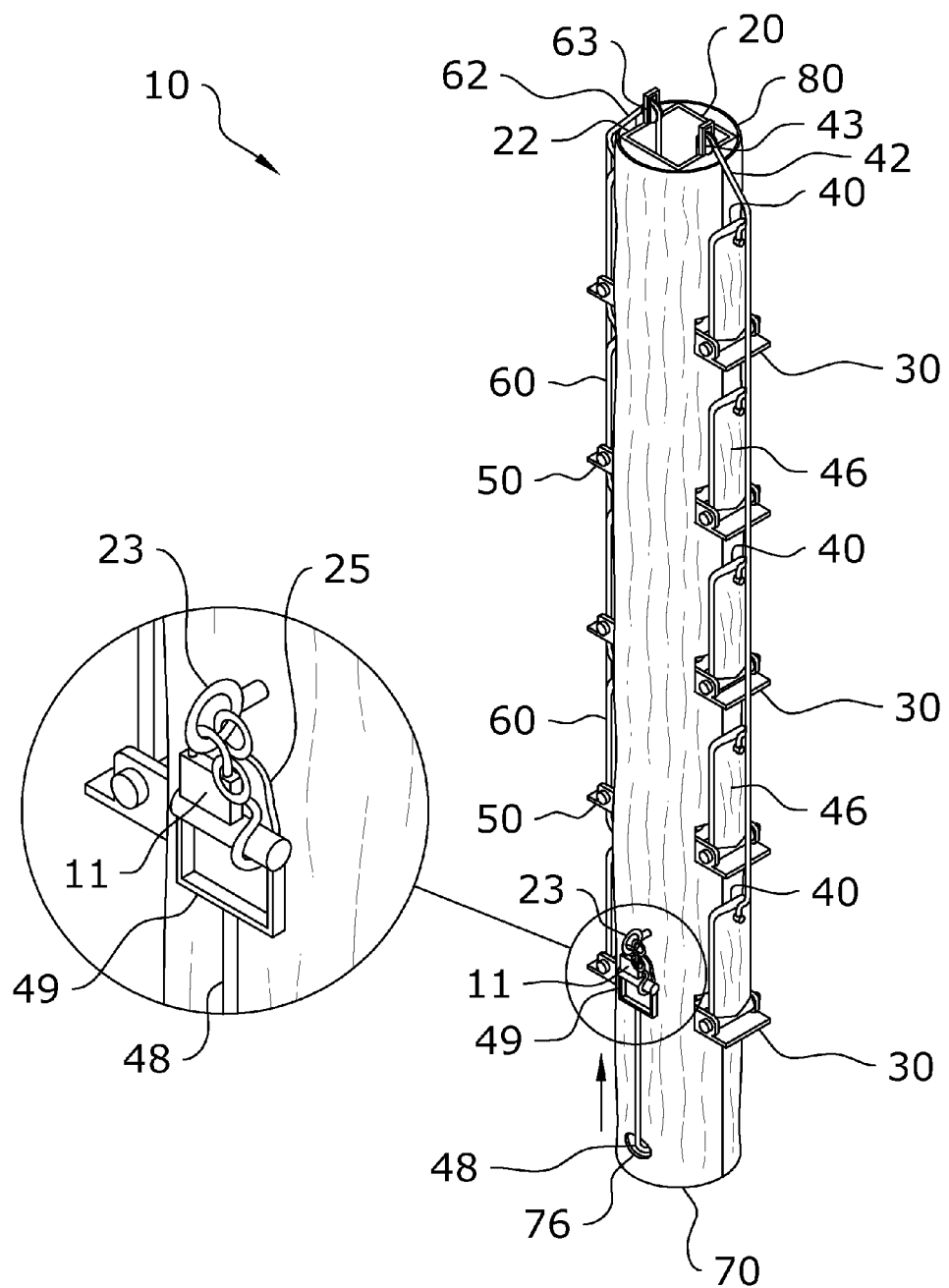
FIG. 17 is an upper perspective view of the first alternative embodiment with the handles in a third state with the lower handle pulled outwardly drawing the upper handle and connectors downwardly with the steps in the raised position.

FIG. 16 is an upper perspective view of the first alternative embodiment with the handles 47, 49 in a second state with the lower handle 49 pulled inwardly with the upper handle 47 pulled upwardly and with the steps 40, 60 raised into the concealed position. FIG. 17 is an upper perspective view of the first alternative embodiment with the handles 47, 49 in a third state with the lower handle 49 pulled outwardly drawing the upper handle 47 and connectors 42, 48, 62 downwardly with the steps in the raised position.

When the lower handle 49 is pulled outwardly, a locking member 25 is attachable to the lower handle 49 to prevent the steps 40, 60 from lowering as illustrated in FIG. 17 of the drawings. The lower handle 49 preferably has a loop structure (e.g. a rectangular loop as shown in FIG. 17) to allow for the locking member 25 to pass through an opening within the lower handle 49 for securing the lower handle 49. The locking member 25 may be comprised of a flexible member (e.g. a strap) or an elongated rigid member. The locking member 25 is attached to an eyelet 23 that is attached to the support member 20 as illustrated in FIG. 17. The opposite end of the locking member 25 has an eyelet or loop that can be secured to the eyelet 23 with a lock 11 (e.g. a padlock) thereby preventing a third-party from accessing the deer stand when the owner is not using the deer stand by keeping the steps 40, 60 in an upright position as shown in FIG. 17.

Figure 20:
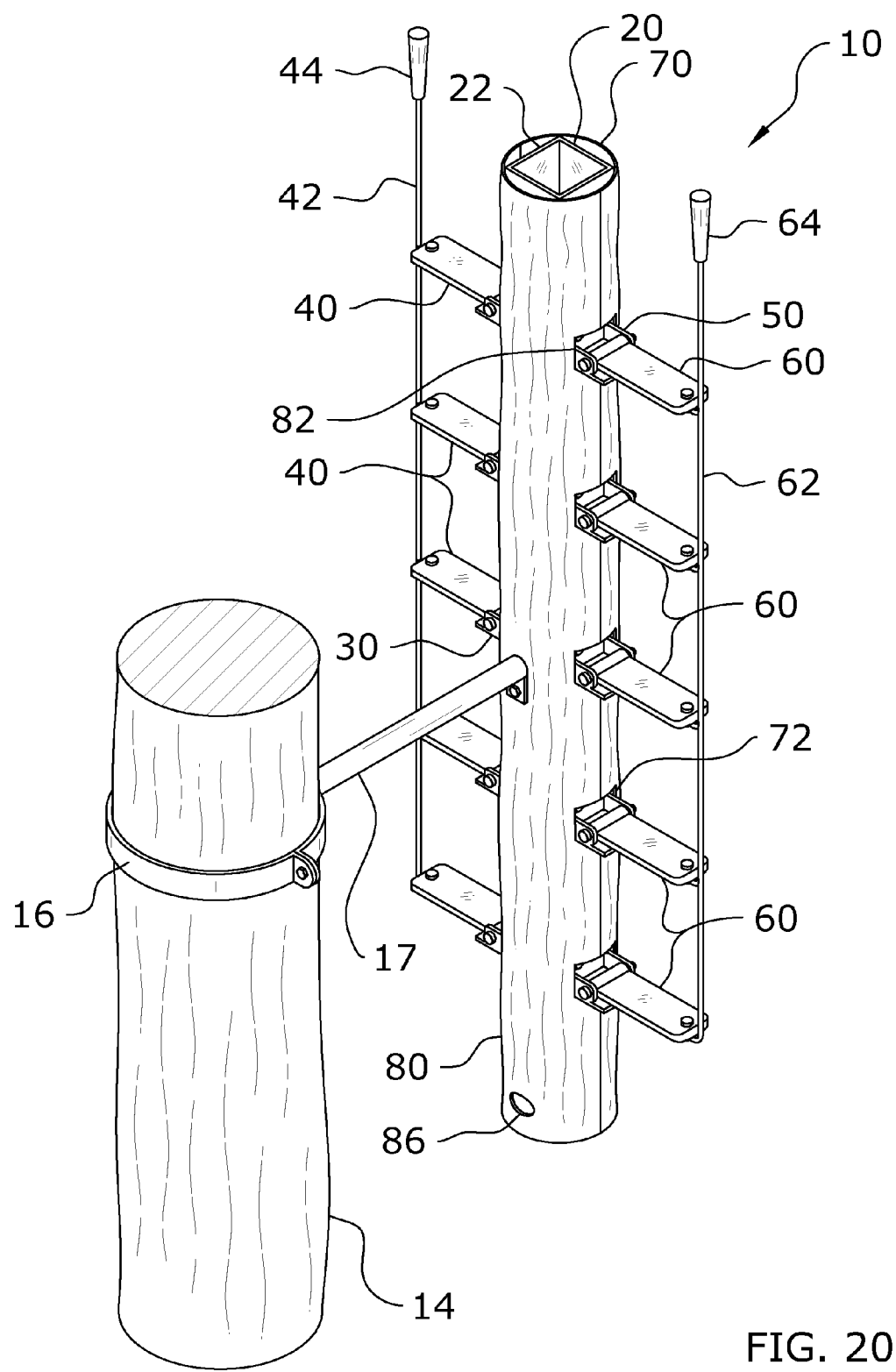
FIG. 20 is an upper perspective view of the present invention connected to a tree by a support bracket surrounding the tree and an arm member extending between the tree and the support member so the support member is distally spaced outwardly away from the tree.
Figure 21:
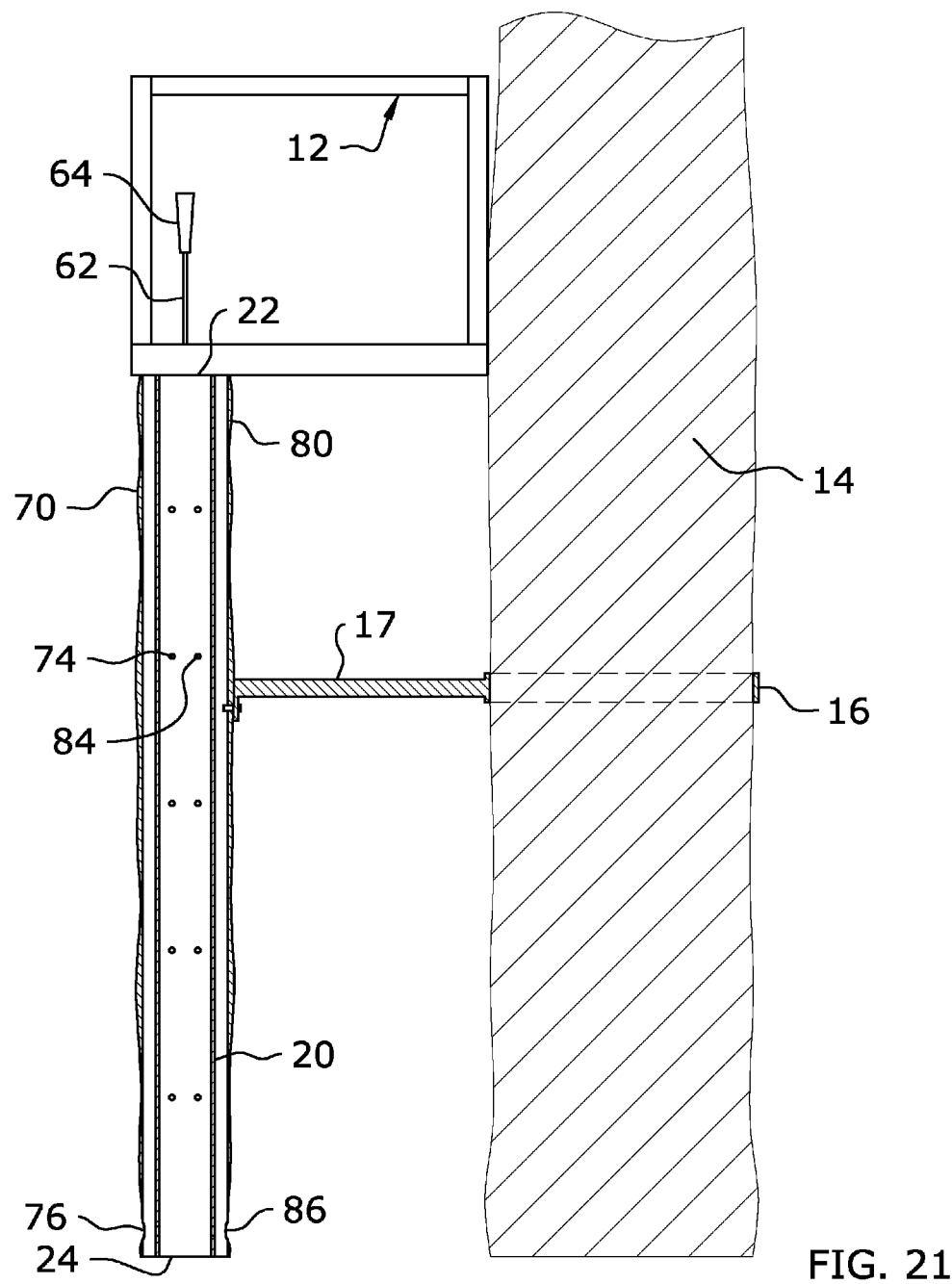
FIG. 21 is a side cutaway view of the present invention attached to a tree with an arm member and a support bracket surrounding the tree with the upper end of the support member attached to the platform.

It is preferable to utilize a first pulley 43 and a second pulley 63 connected to the upper portion of the support member 20 to movably support the corresponding connectors 42, 62. FIG. 20 is an upper perspective view of the present invention connected to a tree 14 by a support bracket 16 surrounding the tree 14 and an arm member 17 extending between the tree 14 and the support member 20 so the support member 20 is distally spaced outwardly away from the tree. The support bracket 16 is comprised of a ring structure that surrounds the tree and is comprised of an adjustable length structure to attach about various diameters of trees 14. The arm member 17 may have various lengths to accommodate various lengths of platforms 12 so the upper end 22 of the support member 20 may be attached to a distal portion of the platform 12 (e.g. by fasteners) as illustrated in FIG. 21 of the drawings.

G. Operation of Preferred Embodiment

In use, the user identifies a location to attach the retractable ladder 10 such as adjacent or near a tree 14. The user then secures the mounting fastener 28 into the tree 14 as illustrated in FIG. 14 of the drawings to secure the lower portion of the retractable ladder 10. Additional fasteners and/or brackets may be utilized to secure the upper and middle portions of the retractable ladder 10 to the tree 14. Once the retractable ladder 10 is attached, the platform 12 is then attached to the tree 14 and/or the upper portion of the support member 20.

To climb up the retractable ladder 10, the user lowers all of the steps 40, 60 so the steps 40, 60 are in the extended state as best illustrated in FIG. 6 of the drawings. The user then steps upon the steps 40, 60 with their feet and grasps the steps 40, 60 with their hands to climb upwardly. Once the user has climbed upwardly and is positioned on the platform 12, the user pulls upwardly upon the connectors 42, 62 to retract the steps 40, 60 into the retracted state thereby concealing the steps 40, 60 and the retractable ladder 10 as best illustrated in FIG. 7 of the drawings. The upper portions of the connectors 42, 62 may be attached to the platform 12 or other structure to prevent the steps 40, 60 from accidentally lowering into the extended state. When the steps 40, 60 are retracted into the refracted state, the steps 40, 60 are difficult to view and appear to be part of the trunk of a tree 14 thereby preventing viewing by humans and animals. When the user desires to climb down from the platform 12 along the retractable ladder 10, the user releases the connectors 42, 62 to allow the steps 40, 60 to extend outwardly into the extended state as shown in FIG. 6. The user then climbs down the retractable ladder 10 using the steps 40, 60. The user may remove the retractable ladder 10 and attach in a different location at any time since the retractable ladder 10 is a lightweight and portable structure.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A retractable ladder, comprising:
   a support member having an elongated structure, an upper end and a lower end;
   a plurality of first steps pivotally attached to a first side of said support member, wherein said plurality of first steps include a corresponding plurality of first camouflage portions attached to a lower surface of said plurality of first steps;

a plurality of second steps pivotally attached to a second side of said support member, wherein said first side of said support member is opposite of said second side, wherein said plurality of second steps include a corresponding plurality of second camouflage portions attached to a lower surface of said plurality of second steps;

wherein said plurality of first steps and said plurality of second steps include an extended state for allowing a user to climb upon said steps and a retracted state to at least partially conceal said steps, wherein said plurality of first steps extend away from said plurality of second steps and wherein said plurality of second steps extend away from said plurality of first steps when in said extended state;

wherein said support member, said plurality of first steps and said plurality of second steps form a vertical compact structure when in said retracted state;

wherein said support member, said plurality of first steps and said plurality of second steps do not form a vertical compact structure when in said extended state;

a plurality of first brackets attached to said support member, wherein each of said plurality of first steps are pivotally attached to a corresponding first bracket of said plurality of first brackets, and a plurality of second brackets attached to said support member, wherein each of said plurality of second steps are pivotally attached to a corresponding second bracket of said plurality of second brackets; and a first connector that is elongated and a second connector that is elongated, wherein said first connector is attached to distal portions of said plurality of first steps and wherein said second connector is attached to distal portions of said plurality of second steps, and wherein said first connector and said second connector allow a user to pull upwardly upon the connectors thereby placing said steps in said retracted state;

wherein said first connector and said second connector are each comprised of a rigid material;

wherein said first connector extends upwardly above an uppermost step of said plurality of first steps a sufficient distance for a user to grasp said first connector to pull upwardly;

wherein said second connector extends upwardly above an uppermost step of said plurality of second steps a sufficient distance for a user to grasp said second connector to pull upwardly; and a first handle attached to an upper portion of said first connector and a second handle attached to an upper portion of said second connector.

2. The retractable ladder of claim 1, wherein said plurality of first brackets support said plurality of first steps in a substantially horizontal position when in said extended state, and wherein said plurality of second brackets support said plurality of second steps in a substantially horizontal position when in said extended state.

3. The retractable ladder of claim 1, wherein said support member has a rectangular cross sectional shape, wherein said first side is parallel with respect to said second side.

4. A retractable ladder, comprising:
a support member having an elongated structure, an upper end and a lower end;
a plurality of first steps pivotally attached to a first side of said support member; and
a plurality of second steps pivotally attached to a second side of said support member, wherein said first side of said support member is opposite of said second side;

wherein said plurality of first steps and said plurality of second steps include an extended state for allowing a user to climb upon said steps and a retracted state to at least partially conceal said steps, wherein said plurality of first steps extend away from said plurality of second steps and wherein said plurality of second steps extend away from said plurality of first steps when in said extended state;

wherein said support member, said plurality of first steps and said plurality of second steps form a vertical compact structure when in said retracted state;

wherein said support member, said plurality of first steps and said plurality of second steps do not form a vertical compact structure when in said extended state;

a plurality of first brackets attached to said support member, wherein each of said plurality of first steps are pivotally attached to a corresponding first bracket of said plurality of first brackets, and a plurality of second brackets attached to said support member, wherein each of said plurality of second steps are pivotally attached to a corresponding second bracket of said plurality of second brackets; and a first connector that is elongated and a second connector that is elongated, wherein said first connector is attached to distal portions of said plurality of first steps and wherein said second connector is attached to distal portions of said plurality of second steps, and wherein said first connector and said second connector allow a user to pull upwardly upon the connectors thereby placing said steps in said retracted state;

wherein said first connector and said second connector are each comprised of a rigid material;

wherein said first connector extends upwardly above an uppermost step of said plurality of first steps a sufficient distance for a user to grasp said first connector to pull upwardly;

wherein said second connector extends upwardly above an uppermost step of said plurality of second steps a sufficient distance for a user to grasp said second connector to pull upwardly; and a first camouflage cover attached to said support member, wherein said first cover covers a front portion of said support member; and a first handle attached to an upper portion of said first connector and a second handle attached to an upper portion of said second connector.

5. The retractable ladder of claim 4, wherein said plurality of first brackets support said plurality of first steps in a substantially horizontal position when in said extended state, and wherein said plurality of second brackets support said plurality of second steps in a substantially horizontal position when in said extended state.

6. The retractable ladder of claim 4, wherein said support member has a rectangular cross sectional shape, wherein said first side is parallel with respect to said second side.

7. The retractable ladder of claim 4, wherein said plurality of first steps include a corresponding plurality of first camouflage portions attached to a lower surface of said plurality of first steps, and wherein said plurality of second steps include a corresponding plurality of second camouflage portions attached to a lower surface of said plurality of second steps.

* * * * *

UNITED STATES PATENT AND TRADEMARK OFFICE
CERTIFICATE OF CORRECTION

PATENT NO. : 9,635,849 B2  
APPLICATION NO. : 14/671428  
DATED : May 2, 2017  
INVENTOR(S) : Sean H. Connor Page 1 of 1

It is certified that error appears in the above-identified patent and that said Letters Patent is hereby corrected as shown below:

On the Title Page

In the Abstract:
Line 11, "refracted" should read "retracted"

In the Specification

Column 5, Line 44, "refracted" should read "retracted"
Column 6, Line 12, "refracted" should read "retracted"
Column 8, Line 32, "refracted" should read "retracted"

Signed and Sealed this
Thirtieth Day of May, 2017

Michelle K. Lee
*Director of the United States Patent and Trademark Office*